United States Patent [19]

Kim et al.

[11] Patent Number: 5,531,124

[45] Date of Patent: Jul. 2, 1996

[54] ULTRASONIC FLOW MEASURING METHOD AND APPARATUS THEREOF

[75] Inventors: Soo D. Kim; Hak S. Chang, both of Seoul; Jong S. Paik, Dajon, all of Rep. of Korea

[73] Assignee: Changmin Technology Co., Ltd., Seoul, Rep. of Korea

[21] Appl. No.: 295,287

[22] Filed: Aug. 24, 1994

[30] Foreign Application Priority Data

Aug. 25, 1993 [KR] Rep. of Korea .................. 93-16627

[51] Int. Cl.⁶ ............................................. G01F 1/66
[52] U.S. Cl. ......................................... 73/861.27
[58] Field of Search ............................. 73/861.27

[56] References Cited

U.S. PATENT DOCUMENTS

| | | | |
|---|---|---|---|
| 2,844,961 | 7/1958 | Hedrich et al. | 73/861.27 |
| 4,004,461 | 1/1977 | Lynnworth | 73/194 A |
| 4,014,211 | 3/1977 | Araki et al. | 73/861.27 |
| 4,103,551 | 8/1978 | Lynnworth | 73/861.27 |
| 4,523,470 | 6/1985 | Müller et al. | 73/623 |
| 4,577,505 | 3/1986 | Jestrich et al. | 73/629 |
| 5,351,560 | 10/1994 | Russworm | 73/861.27 |
| 5,440,936 | 8/1995 | Spani et al. | 73/861.27 |

*Primary Examiner*—Richard Chilcot
*Assistant Examiner*—Jewel V. Artis

*Attorney, Agent, or Firm*—Irving Keschner

[57] ABSTRACT

An ultrasonic flow measuring method and apparatus thereof comprises a plurality of ultrasonic vibrator apparatus mounted around the peripheral edge of a large caliber pipe at predetermined intervals, in which the ultrasonic vibrator apparatus are disposed at intervals of $l=2R/(n+1)$ on one side radius R and at intervals of $l'=R/(n+1)$ on the opposite side radius as well as operated in an alternating sequential arrangement in order to avoid the interference with one another, the ultrasonic vibrator apparatus are mounted on the outer wall of the pipe by being inserted into a hole of the pipe wall at a predetermined angle to the center line of the pipe, and the ultrasonic vibrator apparatus comprises a body inserted into the pipe wall; a first chamber constituted as a part of the body, for receiving an ultrasonic vibrator; and a second chamber constituted as a part of the body, for receiving a block having an acoustic resistance identical to that of the liquid flowing in the large caliber pipe to be measured, in which the ultrasonic vibrator and the block are integrated with each other, and the block is fitted into the body or supported in the body by means of a supporter, the upper surface of which is flush with the inner surface of the pipe.

The ultrasonic flow measuring apparatus comprises an ultrasonic flow measuring circuit, which enables the delay time and the actual propagation distance of the ultrasonic pulses in the liquid to be precisely measured and corrected, if necessary.

5 Claims, 9 Drawing Sheets (A)

(B)

(A)

(B)

ULTRASONIC FLOW MEASURING METHOD AND APPARATUS THEREOF

BACKGROUND OF THE INVENTION

The invention is related to providing an ultrasonic flow measuring technology and, in particular, to providing an ultrasonic flow measuring method and apparatus thereof for measuring the volume flow rate with ultrasonics being scanned in a multi-channel manner into a large caliber pipe.

PRIOR ART

Prior art includes an electronic flow meter, a flow meter in which a flow velocity meter is inserted into one point or numerous points in a pipe and a different compression type of a flow meter well-known as a flow meter for use in a large caliber pipe. Especially, an ultrasonic flow meter is commonly used. The ultrasonic flow meter has an advantage in that its use is convenient in part, because piezo-ceramics for transmitting and receiving ultrasonics are mounted on the inner wall of a pipe. Thereinafter, the piezo-ceramic often called a "Transducer" will be referred to as an "ULTRASONIC VIBRATOR".

FIG. 1 shows an embodiment of a conventional method wherein an ultrasonic vibrator is mounted on the outer portion of a pipe. The ultrasonic vibrator 1, 1' includes fixtures 2, 2', the angled surface of which is mounted on the pipe wall 3, in order to be mounted at a constant angle $\theta$ with respect to the center line of the pipe. In measuring the flow velocity using the ultrasonic vibrator 1, 1', an ultrasonic flow velocity measuring method with minimal error transmits ultrasonics from the vibrator 1 to the vibrator 1' in the direction indicated by the arrows as shown in FIG. 1, opposite to the flow direction and vice versa. At any given moment, the ultrasonic velocity C of the measured liquid is added to the sum of the ultrasonic velocity $C_w$ at the time that the liquid flow stops and the flow velocity component v, which the ultrasonics propagates; otherwise, it is subtracted therefrom.

Therefore, the calculation of the flow velocity is based on differences in time and in frequency. The time difference method of calculation comprises steps of measuring the time $t_+$ for propagating ultrasonic pulses from the vibrator 1' to the vibrator 1 in the direction of the liquid flow and the time $t_-$ for propagating ultrasonic pulses from the vibrator 1 to the vibrator 1' in the direction opposite to the direction of the liquid flow. In other words, $$t_+ = \frac{L}{C_w + v} \ ; \ t_- = \frac{L}{C_w - v} \tag{1}$$

$$\Delta t = t_- - t_+ = \frac{2Lv}{C_w^2}$$

Wherein, the flow velocity v in FIG. 1 is a flow velocity component on the line L, the average flow velocity $V_D$ on the diameter line D is as follows:

$$v = V_D \cdot \cos\theta \tag{2}$$

Thus, the formula (1) is calculated as follows:

$$\Delta t = \frac{2L \cdot \cos\theta}{C_w^2} \cdot V_D \tag{3}$$

If the values of the parameters L, $\theta$ and $C_w$ is previously known, the flow velocity $V_D$ is calculated by measuring the time difference $\Delta t$ with the proportional coefficient ($2L\cos\theta/C_w^2 = A$) which was previously stored in a calculating portion.

There are many other technical methods to calculate the frequency difference, but the principal common to all is as follows:

$$\Delta F = \frac{1}{t_+} - \frac{1}{t_-} = \frac{2v}{L} = \frac{2\cos\theta}{L} \cdot V_D = A' \cdot V_D \tag{4}$$

The great advantage of using the calculation method for determining the difference in frequency is that it is independent of the ultrasonic velocity $C_w$ in liquid. Then, the ultrasonic velocity $C_w$ varies according to the density (non-mass), component and temperature of the liquid, so it has a disadvantage in that the measuring error increases unless the ultrasonic velocity $C_w$ that is directly measured during the measuring of the liquid flow rate is substituted into the formula (3). Herein, it is noted that when the calculation $v^2/C_w^2$ is very small value, it is ignored in derivating the formula (4).

The ultrasonic velocity $C_w$ may be canceled by measuring the liquid temperature, but the ultrasonic velocity $C_w$ can be measured by measuring the time differences $t_+$ and $t_-$ as follows:

$$c_w = \frac{2L}{t_+ + t_-} \ \left( \text{or } c_w^2 = \frac{L^2}{t_+ \cdot t_-} \right) \tag{5}$$

Formula (5) is substituted into the formula (3):

$$\Delta t = \frac{(t_+ + t_-)^2 \cos\theta}{2L} \cdot V_D \tag{6}$$

Next, formula (6) is calculated as follows:

$$V_D = \frac{2L}{\cos\theta} \cdot \frac{t_- - t_+}{(t_+ + t_-)^2} \tag{7}$$

Regardless of which any flow velocity measuring method is selected, a single channel type of ultrasonic flow meter should calculate the flow rate Q as follows:

$$Q = mSV_D = m\frac{\pi D^2}{4} \cdot V_D \tag{8}$$

Wherein m is the flow coefficient of an ultrasonic flow meter (or the proportional coefficient), S is the cross-sectional area of the pipe and D is the inner diameter of the pipe.

As described above, these fundamental principals are adapted to the measuring of the flow rate, and furthermore these principals should not be changed even though various measuring algorithms and flow calculation formulas are developed.

The flow meters have been developed and commercially traded by Japan Tokyo Metering Co., U.S. Controlotron Co. etc. Typically, the ultrasonic flow meter, which measures the flow velocity and calculates the flow rate using a cross correlation function, is a single channel flow meter.

For example, the flow meter is constructed in a single channel flow meter in such a manner that the ultrasonic vibrators 1 and 1' are mounted on the outer wall 3 of the pipe by means of fixtures 2 and 2', independent of methods of propagating ultrasonic signals through liquid. The flow meter initially measures the average flow velocity $V_D$ along a diameter line of the pipe. That is why ultrasonics are propagated through liquid at a constant angle $\theta$ only when the ultrasonic vibrators are mounted at specific points placed on the pipe's diameter and when they reach the other vibrator through the pipe wall 3 and the fixture 2.

If the vibrators are mounted at the positions as shown in FIG. 3 on the outer wall of the pipe, it is very difficult for the vibrators to receive ultrasonics due to the fact that ultrasonics are reflected from the pipe wall into the liquid. Also, as shown in FIG. 2, the flow measuring accompanied by the movement of vibrators 1 and 1' around the peripheral edge of the pipe is to meter only the average flow velocity of the liquid flowing through the diameter line. In other words, even though the vibrators are arranged at many places to measure the flow velocity, the accuracy of the flow measurement is basically not enhanced.

The basic disadvantages of the single channel flow meter provided with at least one ultrasonic vibrator mounted on the outer wall of the pipe are considered to be as follows:

1) a flow proportional coefficient m is not an integer, but a number varying according to the flow rate flowing through the pipe having a given diameter (Cross-sectional area S=constant), for example the flow velocity. The accurate flow rate $Q_o$ is calculated as follows:

$$Q_o = S \cdot V_s \tag{9}$$

Wherein, $V_s$ is the total average flow velocity at which liquid passes through the inner cross-sectional area of a pipe. Thus, the average flow velocity $V_D$ along the pipe diameter line is not equal to the flow velocity $V_s$. Therefore, the flow coefficient m is used to compensate for such a difference.

$$m_v = \frac{V_S}{V_D} \tag{10}$$

The proportion between the measuring value Q', by which the flow coefficient m is canceled in the formula (8), and the flow rate $Q_o$ measured in the standard flow meter is as follows:

$$m_Q = \frac{Q_0}{Q'} \tag{11}$$

Wherein, $m_V$ is a flow velocity coefficient, and $m_Q$ is a flow coefficient.

FIG. 4 shows the distribution of the flow velocity in the pipe varying according to the flow rate.

The flow velocity distribution becomes symmetrical when the linear portion of the pipe is lengthy enough. Thus, the flow velocity distribution laws when the flow rate is larger or smaller are different (a flow meter normally has a measurement difference of 1:10 between the minimum flow measurement and the maximum flow measurement). Thus, the flow coefficient $m_Q$ and the flow velocity coefficient $m_V$ vary according to the flow rate. Regardless of how the coefficients m corresponding to the minimum and maximum flow rate are obtained, the use of their average values in a flow meter often causes a flow measurement error of 4 to 6%. The error as pointed out in the characteristics of a flow meter, for example 0.5 to 1.0%, is referred to as the measurement error of the flow velocity or any given Reynolds Number or a given flow rate, but it is not referred to as the flow rate of the whole area to be measured. The coefficient m is a parameter varying according to the status of the pipe inner wall, the density and viscosity of the liquid and the lineal distance of the pipe. These facts are common disadvantages calculating the time difference, the frequency difference and the time measurement of the cross correlation function.

2) An other disadvantage is that the user must know the exact propagation time $t_s$ at which the ultrasonic pulse passes through a fixture 2 and the outer wall 3 of the pipe if the flow measuring formulas (1)–(8) are to be used. Additionally, the delay time $\tau_o$ of the signals occurring at the electronic circuit of an ultrasonic flow meter and a cable connecting an ultrasonic vibrator to a flow meter must be known. The formulas (1) to (8) are useful for determining the time that the ultrasonic pulses are propagated in liquid. On the other hand, the time directly measured is from the moment that a power source is applied to an ultrasonic vibrator until the moment that the ultrasonic pulse excites the other vibrator to output its electric output signals. Thus, the measured time differs from the times $t_+$ and $t_-$ as follows:

$$t_+' = t_+ + 2t_s + \tau_o$$

$$t_-' = t_- + 2t_s + \tau_o \tag{12}$$

In the time difference calculation method, the terms $2t_s + \tau_o$ are mutually canceled.

For example, $\Delta t = t_-' - t_+' = t_- - t_+$.

This is a great advantage, but because of the term $C^2_w$ of the ultrasonic velocity, the formulas (6) and (7) must be used. The times $t_+'$ and $t_-'$ are substituted into the ultrasonic velocity formula (5).

$$C_w' = \frac{2L}{t_+ + t_- + 4t_s + 2\tau_0} \neq C_w \tag{13}$$

Thus, an ultrasonic velocity measuring error occurs. If the formula (13) is substituted for the term $C'^2_w$ into the flow velocity formula, the ultrasonic velocity measurement error increases (for example, the error is twice the ultrasonic velocity measurement error). Therefore, the propagation time $t_s$ and the delay time $\tau_o$ must be exactly calculated and then subtracted from the times $t_+'$ and $t_-'$. The propagation time $t_s$ may vary according to the materials of fixture 2 and the pipe as well as the pipe thickness and the shape of the fixture. If the propagation time $t_s$ is not exactly measured in situ where the ultrasonic vibrator is installed, it must be assumed (even though the same steel pipes are used, their steel component, are not identical and thus the ultrasonic velocity $C_w$ varies.

In the frequency difference calculating method, the measured times $t_+'$ and $t_-'$ are substituted into the frequency difference formula as follows:

$$\Delta F = \frac{1}{t_+ + 2t_S + \tau_0} -$$

$$\frac{1}{t_- + 2t_S + \tau_0} \neq \Delta F = \frac{2V\cos\theta}{L} \tag{14}$$

This method causes the measuring error of the flow velocity V to be large. Even if the frequency difference method is used without being affected by the term of the ultrasonic velocity $C_w$, the propagation time $t_s$ and the delay time $\tau_o$ must be exactly measured and then be amended by the formula $t_\pm = t_\pm' - t_s - \tau_o$.

3) Another disadvantage is to measure the length L and the angle θ'. If the ultrasonic vibrator is mounted on the outer wall 3 of the pipe with the fixture 2, and the acoustic characteristics according to the materials of fixture 2 and the pipe wall 3 are different from each other, the ultrasonic is refracted while it is propagated in turns from the fixture 2 to the pipe wall 3 and from the pipe wall 3 to the liquid. That is to say, the difference between the acoustic resistances of the steel and the liquid is a multiple of thirty, so the refraction angle can not be ignored. Therefore, due to the refraction propagation of the ultrasonic, it is not easy to exactly measure the propagation distance L of the ultrasonic in the liquid and the angle θ formed between the distance L and the center line of the pipe by means of any measuring means such as a formula. The measuring of the distance L and the angle θ are geometrically calculated in a manner whereby the inner and outer diameters of the pipe are measured, the positions of the ultrasonic vibrators are measured, and the refraction angle is calculated. If the calculated distance L' and angle θ' vary from the actual distance L and angle θ, the measurement errors of the flow velocity and the flow rate are increased.

4) Still another disadvantage is to differentiate between the geometrical distance L and the distance L' by which the ultrasonic pulse is propagated through the liquid to the receiving vibrator as the pipe diameter becomes larger, or the flow rate increases.

The propagation track of the ultrasonic pulse is illustrated in FIG. 5. The ultrasonic beam is pushed toward the flow direction of the liquid (in the same manner as a boat is aimed at the opposite bank of a river at a place far upstream from the target intended to landing point directly across the river).

There is an ultrasonic meter using the phenomena. Assuming that the ultrasonic vibrators 1 and 1' are disposed along a vertical line (a diameter line) perpendicular to the center line of the pipe (referring to FIG. 5, B), and the flow velocity V is zero (V=0), the entire energy of the ultrasonic beam reaches the vibrator 1'. But, when the flow velocity V exceeds zero (V>0), the beam is not propagated in a straight line but rather it is deflected to point b. At that time, the relationship between the angle α and the interval ab (=δl) is as follows:

$$\delta l = D\alpha = D\arcsin \frac{V}{C_w} \approx \frac{Dv}{C_w} \quad (15)$$

$$V = \delta l \frac{C_w}{D}$$

Wherein, D is the inner diameter of the pipe.

Thus, there is a flow meter by which the flow velocity V is measured as the interval ab=δl is measured, and then the flow rate is calculated. That is, the ultrasonic vibrators 1 and 1' are mounted to form the angle θ as shown in FIG. 5B. The ultrasonic beam transmitted at the angle θ does not reach the vibrator 1', but instead it reaches the point b. Thus, the ultrasonic beam launched at the ultrasonic vibrator 1 must be transmitted at the angle θ+Δθ in order to reach the ultrasonic vibrator 1'. The beam forms the curve track of the distance $L_o$ as shown in FIG. 5, B. The distance $L_o$ is different from the distance L, so it satisfies the formula $L_o$>L. Nevertheless, there is a tendency to ignore the phenomena, When the diameter of the pipe is small, and the distance δl is very short. But it can't be ignored when the diameter of the pipe is large, and the average flow velocity is high. For example, assuming that V is equal to 5–10 m/s, θ is equal to 45° and D is equal to 2–3 m, the formula $(L_o-L)/L=2\%$ is established. In other words, if the flow rate is measured using the distance L instead of the distance $L_o$, the flow measuring error is 2–4%. Whereas, if D is 0.5 m, the error is less than 0.2% (Then, it is common to consider the error (for example 0.5%) set forth in the specification of an ultrasonic flow meter as the resulting error of the flow measurement).

In the method of mounting an ultrasonic vibrator on the outer wall of a pipe as described above, it is difficult to exactly measure the geometric distance L, and the measuring error may become large, while the floe measuring error may be large even if the diameter of the pipe is small,. Also, the phenomena by which the ultrasonic beam is not propagated in a straight line in liquid makes the distance to be $L_o \neq L$.

On the other hand, it is possible that the ultrasonic beam may be reflected on the inner wall of the pipe in order to avoid an increase in the flow or flow velocity measurement error. In that case, the time difference calculation method is adaptable as follows:

$$\Delta t = 2H \frac{V_D}{C_w^2} \quad (16)$$

It is not affected by the distance L. But, when the ultrasonic velocity $C_w$ is measured by the formula (5), and the frequency difference calculation method is adapted, the true distance (the actual distance) $L_o$ must be identified.

5) Still another disadvantage to the method of mounting ultrasonic vibrators 1 and 1' on the outer wall of the pipe is that the ultrasonic vibrator is used only in a single channel ultrasonic flow meter being capable of measuring the flow velocity along the diameter line of a pipe.

The one channel flow meter has advantages in that it is portable and convenient to mount on the pipe wall. On the contrary, the disadvantages are that if the flow rate flowing through a large caliber pipe is measured, and the flow meter is not corrected by checking it against a standard flow meter, the substantial flow measurement error may become large.

Accordingly, it is desirable for these disadvantages to be eliminated. Thus, the invention realizes a multi-channel flow measuring apparatus which measures various flow velocities along a number of chords in addition to gauge the flow velocity along a diameter line, thereby significantly enhancing the accuracy of the average flow velocity measurement in the cross-sectional area of the pipe.

The multi-channel flow measurement principal is illustrated in FIG. 7. For example, the total average flow velocity $V_s$ of the cross-sectional area is obtained as follows, after many flow velocities V1, V2, ... V5 along a number of chords are measured, respectively.

$$Vs = \frac{1}{2R} \int_{-R}^{R} V(r)dr \quad (17)$$

Wherein, the integral formula can be computed by two methods. Either an approximation integral method or a curve function V(r) shown along the dotted line in FIG. 7, where B represents as a predetermined function. The greater the number of channels, the smaller the error in the integral formula (16). On the other hand, the method for increasing the measurement data value without increasing the number of ultrasonic channels will be explained in detail later. The ultrasonic vibrator mounting method and the distance measuring method related therewith will now be described in detail:

As described above, if an ultrasonic vibrator is mounted on the outer wall of a pipe in order to measure the average flow velocity along chord line of the pipe, it is difficult to transmit the ultrasonic into the liquid. Even if the ultrasonic pulse is launched in liquid, it cannot reach the other ultrasonic vibrator mounted on the opposite outer wall of the pipe. Thus, the easiest two countermeasures are as follows:

First, as shown in FIG. 8, the pipe wall 3 is formed at a right angle to the direction of the ultrasonic beam at the places where the ultrasonic vibrators 1 and 1' are to be mounted. In that case, the flow velocity distribution is distorted not to form the flow velocity distribution as shown in FIG. 7, B. This increases the approximation integral error.

Second, as shown in FIG. 9, holes are made in the pipe walls to provide for inserting the ultrasonic vibrators 1 and 1' thereinto. The ultrasonic vibrators 1 and 1' are thereby in direct contact with the liquid. Adapting this method, it is relatively easy to measure an angle θ and a distance L between the ultrasonic vibrators, and it is also convenient due to the lack of propagation time $t_s$, but the ultrasonic vibrators 1 and 1' are mounted at a specific angle in the apertures, so that cavities 5 and 5' are formed between the pipe walls 3 and the ultrasonic vibrators 1 and 1'. This causes an eddy current in the cavities 5 and 5', thereby leading to the distortion of the flow velocity distribution. Thus, it has been claimed in light of these problems that the ultrasonic vibrators may be mounted on the outer wall of a pipe. But, the effect of the eddy current is insignificant if the pipe diameter is large, but if the effect of the eddy current is ignored in a relatively smaller pipe, the complementary flow measurement error occurs. Furthermore, although any filler can be inserted into the cavities 5 and 5', the acoustic characteristics of the filler may cause adverse effects such as inducing the reflection of an ultrasonic beam or not reflecting the ultrasonic beam to the intended place.

Accordingly, considering these problems, another object of the invention is to provide a flow measuring method and apparatus thereof for calculating the entire average flow velocity of the liquid flowing area, thereby reducing the flow measurement error without applying the correction procedure performed by the standard flow measuring apparatus.

Another object of the invention is to provide a flow measuring method and apparatus thereof to provide the exact measurement of the entire delay time of the flow measuring apparatus, the substantial ultrasonic propagation distance and the angle according to the liquid to be precisely measured.

The invention comprises a plurality of ultrasonic vibrator apparatus mounted around the periphery of a large caliber pipe at predetermined intervals, in which the ultrasonic vibrator apparatus are disposed in the intervals of $l=2R/(N+1)$ when one side radius R is calculated from the center of the diameter line to the circumference of the pipe, and other ultrasonic vibrators are arranged at the intervals of $l'=R/(N+1)$ on the opposite side radius thereby doubly enhancing the measuring effect of multi-channel ultrasonic vibrators, and the ultrasonic vibrators include ultrasonic generating vibrators and ultrasonic receiving vibrators operated in an alternating arrangement to avoid interfering with one another.

Also, if each of ultrasonic vibrator apparatus is mounted on the outer wall of the pipe, they are inserted into their respective holes in the pipe wall at predetermined angles to the center line of the pipe. The ultrasonic vibrator apparatus comprises a body inserted into the pipe wall; a first chamber constituted as a part of the body for receiving an ultrasonic vibrator; and a second chamber constituted as a part of the body, for receiving a block having the same acoustic resistance as that of the liquid flowing in the large caliber pipe to be measured, in which the ultrasonic vibrator and the block are integrated with each other, and the block is fitted into the body or supported in the body by means of a supporter, the upper surface of which is flush with the inner surface of the pipe.

Also, in another embodiment, a partition wall is formed between the first chamber and the second chamber instead of the block, an inlet and an outlet are formed in the second chamber and a transparent member is covered on the upper portion of the second chamber. Furthermore, the block may protrude into the inner wall of the pipe to correct the flow measuring apparatus at a predetermined distance ($\Delta L$) to exactly measure the flow velocity of liquid in the pipe.

BRIEF DESCRIPTION OF THE DRAWINGS

The invention will be now described in detail with reference to the accompanying drawings, in which.

DETAILED DESCRIPTION OF THE INVENTION

Figure 9:
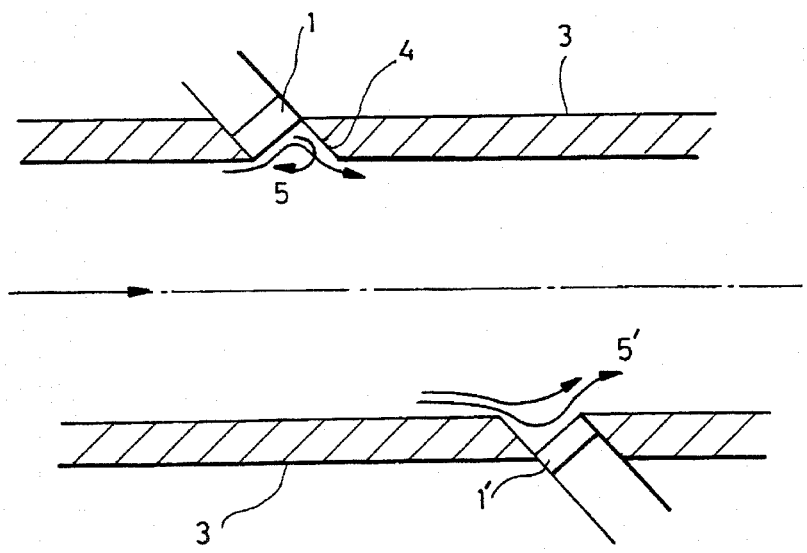
FIG. 9 is a view illustrating another embodiment of the ultrasonic vibrators mounted in the holes which are located in the outer wall of the pipe.
Figure 10:
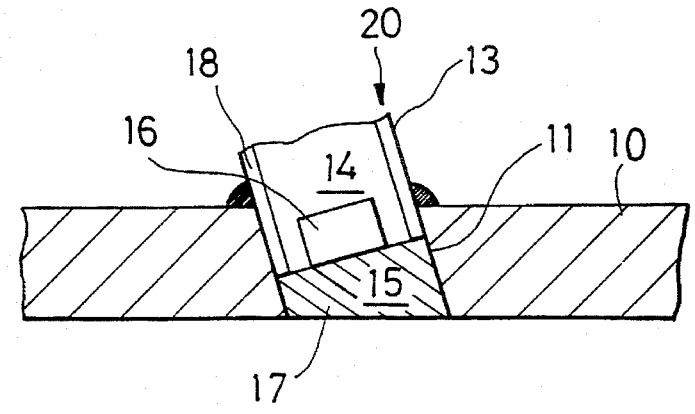
FIG. 10 is a view illustrating one embodiment of an ultrasonic vibrator apparatus mounted in the holes which are located in the outer wall of the pipe according to the invention.

Referring to FIG. 10, a pipe 10 includes a hole 11 located at an angle on the wall thereof. An ultrasonic vibrator apparatus 20 is inserted into the hole 10 at the predetermined angle. In this case, a block 17 is coupled with an ultrasonic vibrator 16 to fill the space between the ultrasonic vibrator 16 and the pipe wall as shown in FIG. 9. An ultrasonic vibrator apparatus 20 comprises a body with a predetermined length, which is divided into a first chamber 14 and a second chamber 15.

The first chamber 14 includes a hollow portion for receiving the ultrasonic vibrator 16 therein and a packing material 18 fixed around the inner circumference thereof to support block 17 as described below.

The second chamber 15 includes a cavity occupying a part of hole 11, the front surface of which is a horizontal surface flush with the inner surface of the pipe wall. The block 17 is inserted into the cavity in the form of a trapezoid in the same configuration, on the rear surface of which the ultrasonic vibrator 16 is correctly mounted in the first chamber 14.

On the other hand, the block 17 has an acoustic resistance ($\int sCs$; $\int s$—the density of the substance, Cs—the ultrasonic velocity of the substance) the same as or similar to that ($\int_w' C_w$) of the liquid flowing in the pipe. For example, if the liquid is water, the organic glass such as plexiglass, which has the same acoustic resistance as that of water, may be used.

Figure 11:
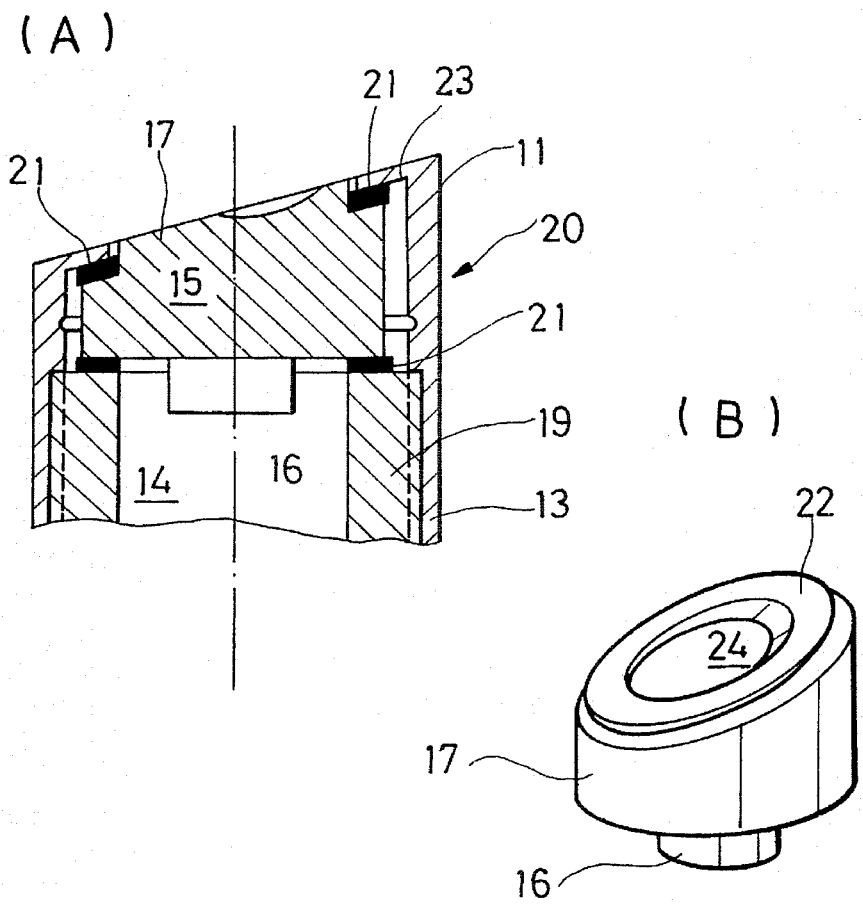
FIG. 11, A and B are views illustrating another embodiment of the ultrasonic vibrator apparatus according to the invention.

FIG. 11 is a view illustrating another embodiment of an ultrasonic vibrator apparatus, in which the same numbers refer to the same elements as those in the first embodiment.

The ultrasonic vibrator apparatus 20 comprises a body 2 divided into first and second chambers 14 and 15. The first chamber 14 includes an ultrasonic vibrator 16 positioned in the hollow portion thereof, and the second chamber 15 is provided with a block 17 correctly positioned therein, on the lower surface of which is mounted the ultrasonic vibrator 16. A supporter 19 is fixed around the circumstance of the first chamber 14 to support the block 17.

At least one auxiliary member 21 such as packing is mounted between the lower surface of block 17 and the upper surface of supporter 19 or between the step surface of projection 22 and the upper extension 23 of the second chamber 15 as described below. Block 17 protrudes upward to form the step shaped projection 22 having a smaller diameter than the diameter of block 17 so that it comes into contact with the liquid flowing in the pipe. The auxiliary member 21 positioned around the step surface is coupled with the extension 23 which protrudes toward the inner portion of the second chamber 15. Thus, the second chamber 15 tightly retains the block 17 with extension 23 and auxiliary members 21.

On the other hand, the configuration makes it difficult to select the substance of the block 17 so that it has the same acoustic resistance ($\int_w' C_w$) as that of various liquids. The block 17 is made of the substance approximately having the same acoustic resistance as that of the liquid ($\int_w' C_w$). Also, the block 17 causes the ideal transverse waves to not be transmitted through its convexed (projected) surface into the liquid. Thus, block 17 includes a shallow cavity 24 formed on the front surface of the second chamber 15 in a streamlined shape so as to assure the efficient transmission of the transverse waves as well as to minimize the effect on the flow velocity distribution. The bottom surface of the cavity 24 is maintained parallel to the surface of the ultrasonic vibrator 16. Furthermore, if the substance of block 17 is worn away by the liquid flow or corroded due to a reaction with the liquid, the surface of block 17 may be coated with substances with endurance and anti-corrosion properties. If materials suitable for the acoustic resistance of the liquid are not suitable for the block 1, the ultrasonic vibrator apparatus 20 may be constructed as shown in FIG. 12.

Figure 12:
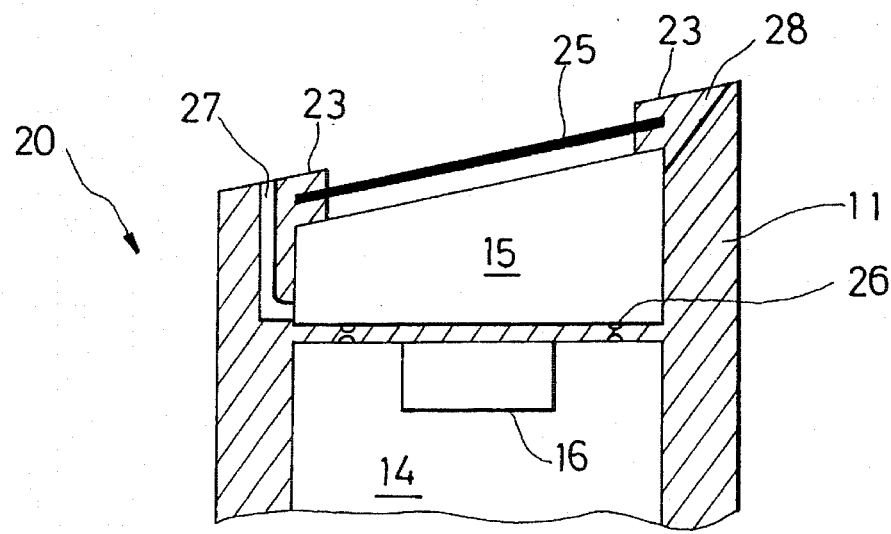
FIG. 12 is a view illustrating another embodiment of the ultrasonic vibrator apparatus according to the invention.

Referring to FIG. 12, a body 11 comprises a first chamber 14 and a second chamber 15 separated by a partition wall 26. An ultrasonic vibrator 16 is mounted on the lower surface of the partition wall 26 in the first chamber 14. The second chamber 15 includes a hollow portion 15 formed therein and a metal plate 25 supported by an extension 23 which protrudes inward from the circumference of the upper end of the body 11. Holes 27 and 28 are located in the wall of body 11, which enables the liquid in the pipe to communicate with the liquid in the hollow portion 24. This makes the pressure in cavity 15 the same as the liquid pressure in the pipe, and the pressures on both sides of the thin metal plate 25 become the same. Thus, the metal plate 25 is not broken down or crushed, or distorted. Of course, the metal plate 25 may become thinner, but its thickness is preferably selected to be of a thickness capable of passing through a maximum amount of ultrasonic (in conditions where the user knows the ultrasonic wavelength).

Herein, it is noted that the ultrasonic vibrator apparatus 20 causes the propagation time $t_s$ to be delayed just like the phenomena that occurs when the ultrasonic vibrator 16 is mounted on block 17. Thus, the time required for the ultrasonic to pass through the block must be previously measured. The measuring method will be described below.

The ultrasonic vibrator apparatus 20 constructed as described above is arranged according to the principal of the invention in order to measure the flow velocity in a large caliber pipe. The invention concerns a multi-channel flow measuring apparatus comprising a plurality of ultrasonic vibrator apparatus which are mounted around the circumference of the pipe in a predetermined arrangement to measure various flow velocities.

One feature of the multi-channel flow measuring apparatus is that the greater the number of channels on chords which are intended to measure the flow velocity, the less the measurement error of average flow velocity on the whole cross-sectional area of the pipe. Thus, the multi-channel flow measuring apparatus eliminates the necessity to correct with a standard flow measuring apparatus. This allows the multi-channel flow measuring apparatus to be used as an ultrasonic flow measuring apparatus for a large caliber pipe. But, a large number of channels of ultrasonic flow velocity to be measured causes a great burden. For example, it causes a circuit of an ultrasonic flow measuring apparatus to become complex as well as to have an increased price. Also, in order to reduce the measurement error, the delay time $\tau_o$ must be kept the same independent of the number of measuring channels. Thus, it is very reasonable to use one electronic circuit and switch the measuring channels in sequence. To the contrary, the greater the number of channels, the longer it takes to perform the flow measuring procedure.

It is very desirable if the position selection of the ultrasonic flow measuring channel, that is, the proper selection of the ultrasonic vibrator's mounting position causes an increase in the number of channels. In other words, it is assumed that the longitudinal dimension of the pipe is long enough to form the symmetry of the flow velocity distribution on both sides of the pipe by reference to the diameter. Then, the channel position is selected as follows:

First, the diameter line is considered as one channel, because that is where the flow velocity is greatest. The half-circle portions at both the right and left sides (or the top and bottom sides) by reference to the diameter line has the same number of channels (n=(N+1)/2(N–the total number of channels) to be measured. For example, at the left side radius, the channels are arranged at intervals as follows:

$$l = \frac{R}{n+1} = \frac{2R}{N+1} \qquad (18)$$

At the right side radius, the last channel (the chord length is shortest) is positioned as follows:

$$l' = \frac{l}{2} = \frac{R}{2(n+1)} = \frac{R}{N+1} \qquad (19)$$

Subsequent channels are formed so that the ultrasonic vibrators are arranged at intervals of l.

Figure 13:
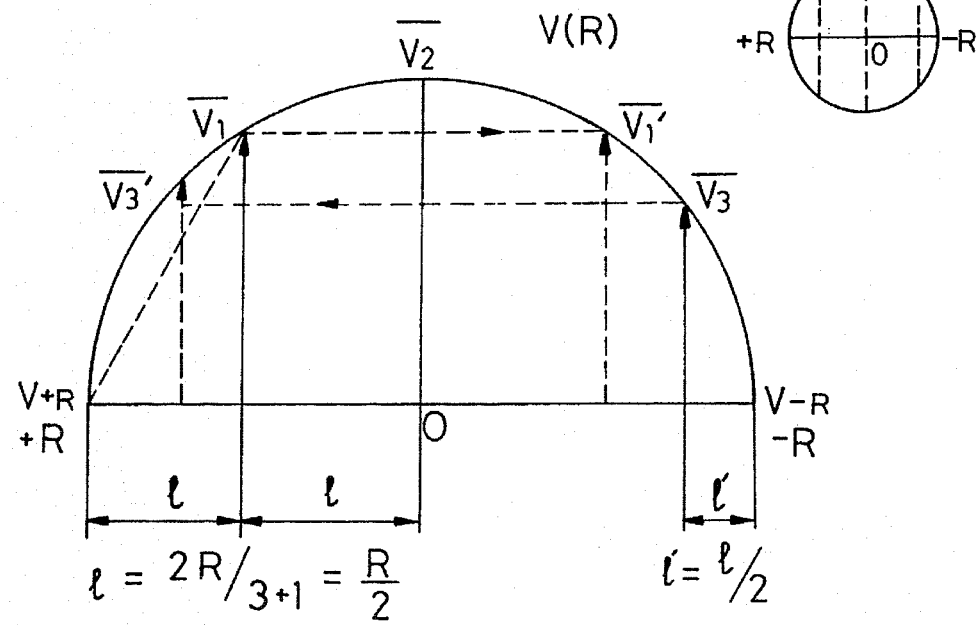
FIG. 13, A and B are views illustrating the arrangement of the ultrasonic vibrators around the circumference of the large caliber pipe according to the principal of the invention.
Figure 13:
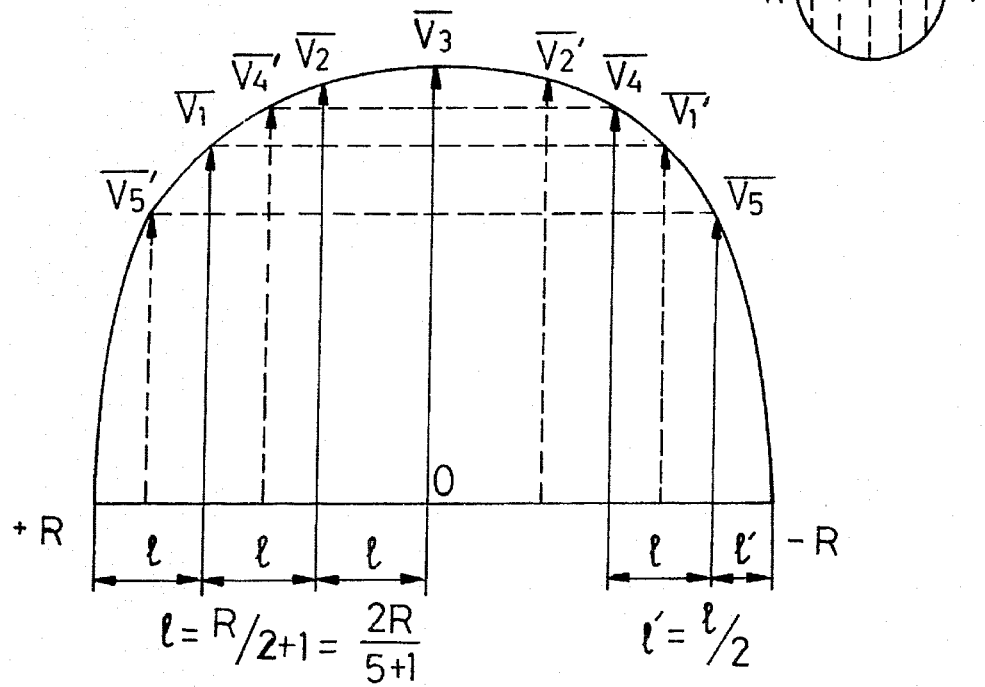

FIG. 13 illustrates the principal wherein the flow velocities measured at every channel are included in the calculation of the total average flow velocity $V_s$ corresponding to the cross-sectional area of the pipe in light of the arrangement of three and five channels.

In order to calculate the total average flow velocity $V_s$, it is assumed that the flow velocities at the predetermined positions are $V_1, V_2, \ldots V_n$, and the flow velocities $V_{+R}$ and $V_{-R}$ at points +R and −R are zero. These flow velocities are inserted into the approximation integral formula or integrated after being inserted into the curve function V(r). Then, the flow velocities measured at the right side radius ($V_3$ at three channels, $V_4$ and $V_5$ at five channels) are inserted into the coordinates corresponding to the left side radius ($V_3'$, $V_4'$, $V_5'$ as shown in FIG. 13). Similarly, the flow velocities measured at the left side radius are inserted into the coordinates corresponding to the right side radius ($V_1'$, $V_2'$ as shown in FIG. 13). The last channels ($V_3$ or $V_5$) is constituted as l'=l/2, because the flow velocity distribution at the center portion of the pipe may be exactly expressed by the log function or exponential function. However, the flow velocity distribution near the pipe wall is significantly altered according to the Reynolds Number (Re), so it is difficult to express by a simple log or exponential function. If the measuring data at or near the pipe wall, as shown in a dotted line adjacent to the left curve in FIG. 13 is insufficient, the integration error may be large.

As described above, the flow velocities obtained by the predetermined channel arrangement are used in the left and right coordinates, thereby significantly reducing the error of the integration computation for the total average flow velocity. As shown in FIG. 13, setting the three channels has the effect of the five channel's flow velocity measuring, and setting the five channels has the effect of nine channel's flow velocity measuring. That is to say, the average flow velocity $V_s$ is calculated based on seven data points on three measuring channels or eleven data points on five measuring channels, assuming that the flow velocities $V_{+R}$ and $V_{-R}$ at or near the pipe wall are zero. This enables the flow measuring range to be much more enlarged, the configuration of the flow measuring apparatus becomes simpler, and its manufacturing costs are reduced.

Additionally, when the ultrasonic scanning of the multi-channel flow measuring apparatus is performed, it is noted that if the ultrasonic vibrators are operated in turn at every channel, the flow measuring time is prolonged, while if all vibrators are simultaneously operated, mutual interference phenomena are inevitable. Thus, in order to avoid receiving interference, the ultrasonic frequencies at every channel must be set at different times from one another. At that time, the measuring time is shorten over the sequential operation of the ultrasonic vibrators, but if the difference between frequencies f1, f2, . . . fn is set higher, the circuit for receiving the ultrasonic pulse and generating the time measuring control pulse makes an error of one period. Thus, the ultrasonic pulse period is changed for every channel, and its correction is difficult. To the contrary, if the frequency difference is selected to be small, a narrow band filter is used, and a serious distortion of the receiving signal occurs, so that the time measuring error may be large.

Figure 14:
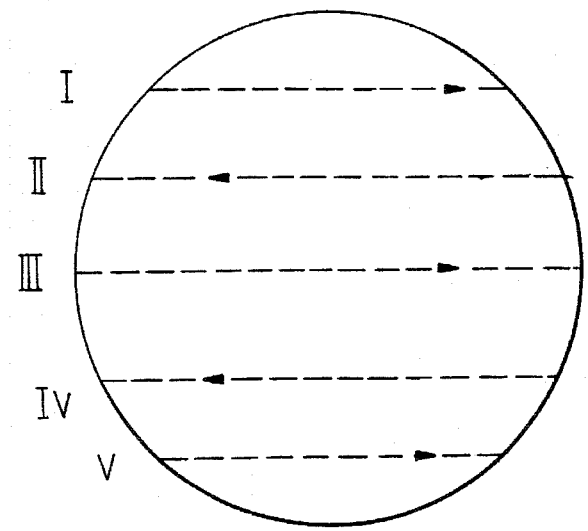
FIG. 14 is a view illustrating the propagation direction of the ultrasonic pulses from the ultrasonic vibrator according to the principal of the invention.

In order to remove these disadvantages, the transmitting directions of adjacent ultrasonics on every channel alternate as shown in FIG. 14. This allows the interval between the channels via which the ultrasonics are transmitted in the same direction to be much wider, thereby preventing the interference between the ultrasonic pulses even though the ultrasonic frequency difference between channels is small.

Figure 15:
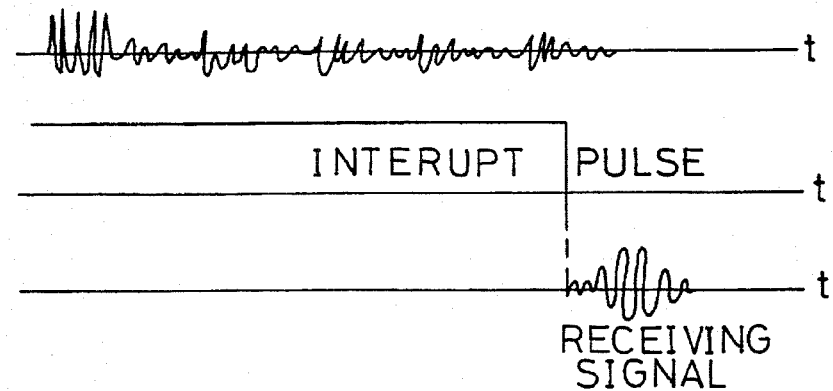
FIG. 15 is a view illustrating the method for removing spurious signals other than desired ultrasonic pulses when a noise suppressing circuit is used according to the principal of the invention.

Furthermore, if any noise squelching circuit is used, the effect on the reduction of the flow measuring error is high. For example, the ultrasonic pulse on every channel is transmitted at the time of the maximum flow velocity or the maximum flow rate, while the receiving interrupt pulse is generated in the receiving circuit, thereby blocking the noise input before reaching the signal (referring to FIG. 15).

On the other hand, the propagation time $t_s$ of the ultrasonic signal passing through a block, the delay time $\tau_o$ generated in an electronic circuit and the distance $L_o$ of the ultrasonic signal passing through liquid must be measured, because they are related to the correction test of an ultrasonic flow measuring apparatus. Herein, the propagation time $t_s$ and the delay time $\tau_o$ are previously measured, precisely, the measured data is inputted to an ultrasonic flow measuring apparatus and it also must be corrected for the calculation of the flow velocity or the flow rate as mentioned above (refer to the formulas 13 and 14).

Figure 16:
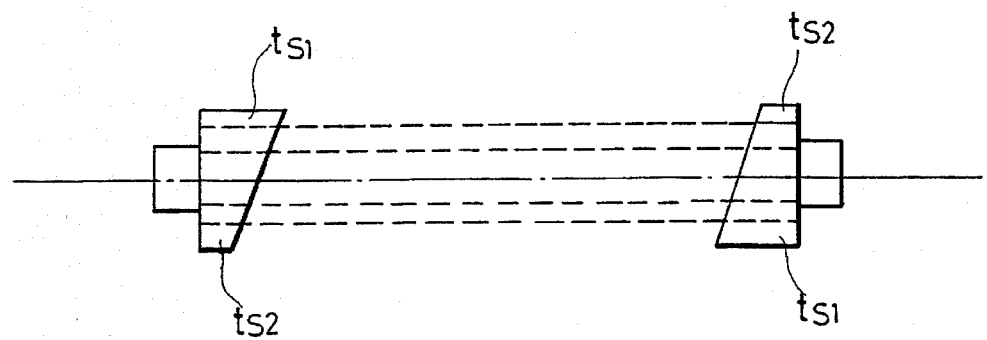
FIG. 16 is a view illustrating the method of compensating for the propagation time of the ultrasonic pulse according to the principal of the invention.
Figure 17:
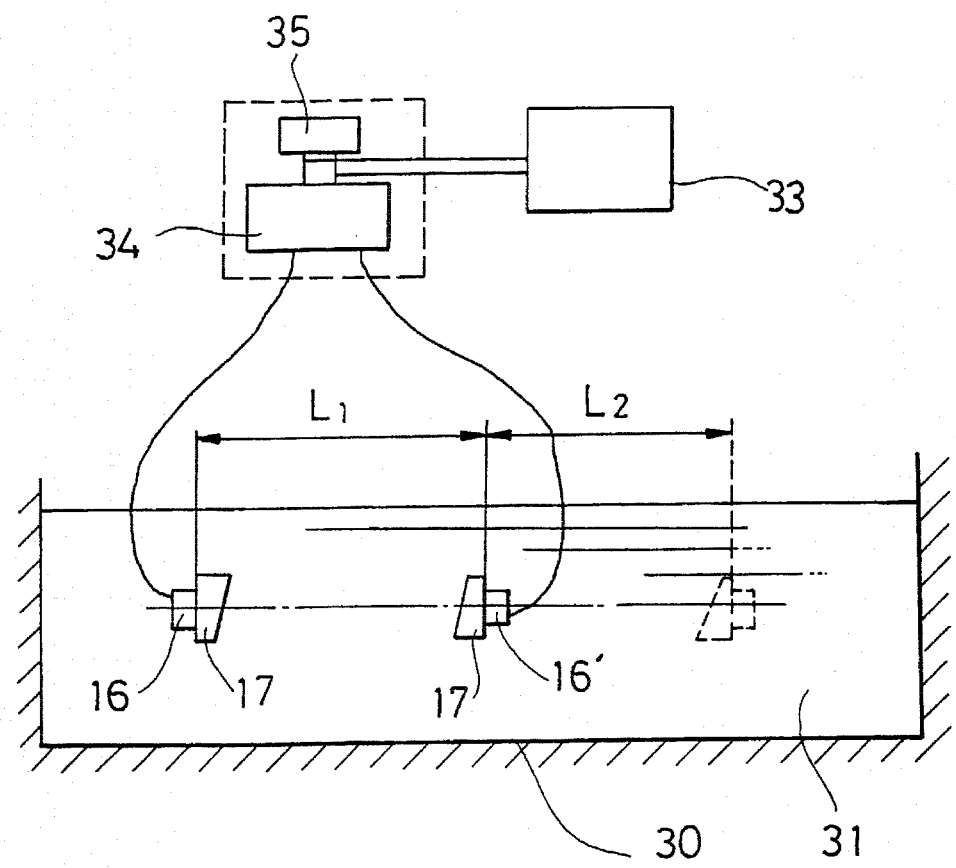
FIG. 17 is a view illustrating the method of measuring the previous delay time in a flow measuring circuit in order to compensate for the propagation time of the ultrasonic pulse according to the principal of the invention.

Also, the block surface is a slanted surface, so the thickness of the block is not in the region. Thus, the ultrasonic pulse is not only distorted at the rising edge at the time of propagating by the convexed surface of one block and then passing through the liquid, but it is also distorted by the rising edge at the time of reaching the other block to be inputted to a receiving vibrator. This has a detrimental effect on the delay time $\tau_o$ in generating the operation starting and stopping pulses by a time measuring control apparatus such as a timer. For example, even if the blocks are disposed against each other in the reverse-symmetry relationship as shown in FIG. 16, the signal distortion is not compensated at the receiving side. It is the same effect when the ultrasonic signals are received at the outer wall of a pipe through a fixture. Therefore, the propagation time "$t_s$" of the ultrasonic pulse passing through a block, including an ultrasonic vibrator apparatus and the delay time $\tau_o$ generated in the flow measuring circuit, must have been previously measured in liquid, simultaneously. For example, a "$t_o$" is calculated by the formula $t_o = 2t_s + \tau_o$ as follows:

As shown in FIG. 17, a water container 30 is filled with liquid 31, and ultrasonic vibrators 16 and 16' respectively attached to blocks 17 are disposed on the same line at a predetermined distance $L_1$ from each other. The distance $L_1$ is set approximately at the geometrical distance when ultrasonic vibrators are mounted on the pipe to be measured.

The ultrasonic vibrators 16 and 16' are electrically connected to a flow measuring circuit 34. The flow measuring circuit 34 includes a timer 35 which inputs a time measuring pulse, a stopping pulse and a starting pulse set to a time difference standard meter 33. The time difference standard meter 33 measures the propagation time $t_1$ of the ultrasonic pulses which are repeatedly transmitted from the ultrasonic vibrator 16 to the ultrasonic vibrator 16' or from the ultrasonic vibrator 16' to the ultrasonic vibrator 16. The measured time $t_1$ is as follows:

$$t_1 = \frac{L_1}{C_w} + 2t_0 + \tau_0 = \frac{L_1}{C_w} + t_0 \quad (20)$$

The error of the time difference standard meter 33 is ignored. Next, the ultrasonic vibrator 16' is moved $t_o$ the right at a distance of $L_2$ in the drawing. Then, the propagation time $t_2$ is measured as follows:

$$t_2 = \frac{L_1}{C_w} + \frac{L_2}{C_w} + t_0 \quad (21)$$

Wherein, $C_w$ represents the ultrasonic velocity in the liquid. Formula 21 is then subtracted from formula 20 as follows:

$$\Delta t_{21} = t_2 - t_1 = \frac{L_2}{C_w} \quad (22)$$

Time formula 22 (for passing through distance $L_2$ in the liquid) is expressed as follows:

$$C_w = \frac{L_2}{\Delta t_{21}} \quad (23)$$

Formula 23 is substituted into the formula 20 as follows:

$$t_0 = t_1 - \frac{L_1}{C_w} = t_1 - \frac{L_1}{L_2} \Delta t_{21} \quad (24)$$

Figure 18:
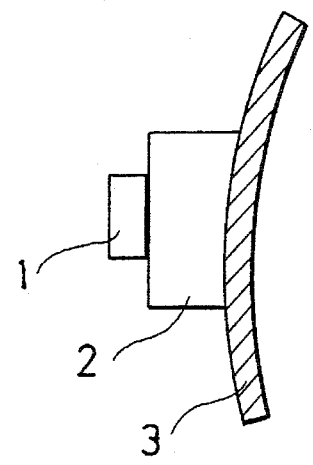
FIG. 18 is a view illustrating the method of measuring the previous delay time if the ultrasonic vibrator is mounted on the outer wall of the pipe as in prior art.

Similarly, as shown in FIG. 18, a one channel ultrasonic flow measuring apparatus, to which an ultrasonic vibrator is mounted on wall 3 of a pipe by means of a fixture 2, must have its flow calculation algorithm be corrected with the time measured by the method described above. The measuring of the time must be performed with the fixtures, including a part of the wall being positioned in a liquid container along with the ultrasonic vibrator as described above. Also, the measurement of the actual distance $L_o$ of the ultrasonic beam's passing through the liquid concerns a correction test. In the actual distance $L_o$ as described above referring to FIG. 5, A and B, as the diameter becomes larger and the flow velocity increases, the geometric distance L between the block surfaces receiving the ultrasonic beam is not equal to the propagation distance $L_o$ of the ultrasonic beam, so that the propagation distance $L_o$ exceeds the actual distance $L_o > L$). The propagation distance $L_o$ can not be measured in a geometric manner. Theoretically, the propagation distance $L_o$ may be calculated by using the formula of functions such as an angle θ, a flow velocity $V_i$, the inner diameter of the pipe (D=2R) and an ultrasonic velocity f in liquid $C_w$, but the direct measurement through experiments may be more reliable and much more accurate.

Figure 19:
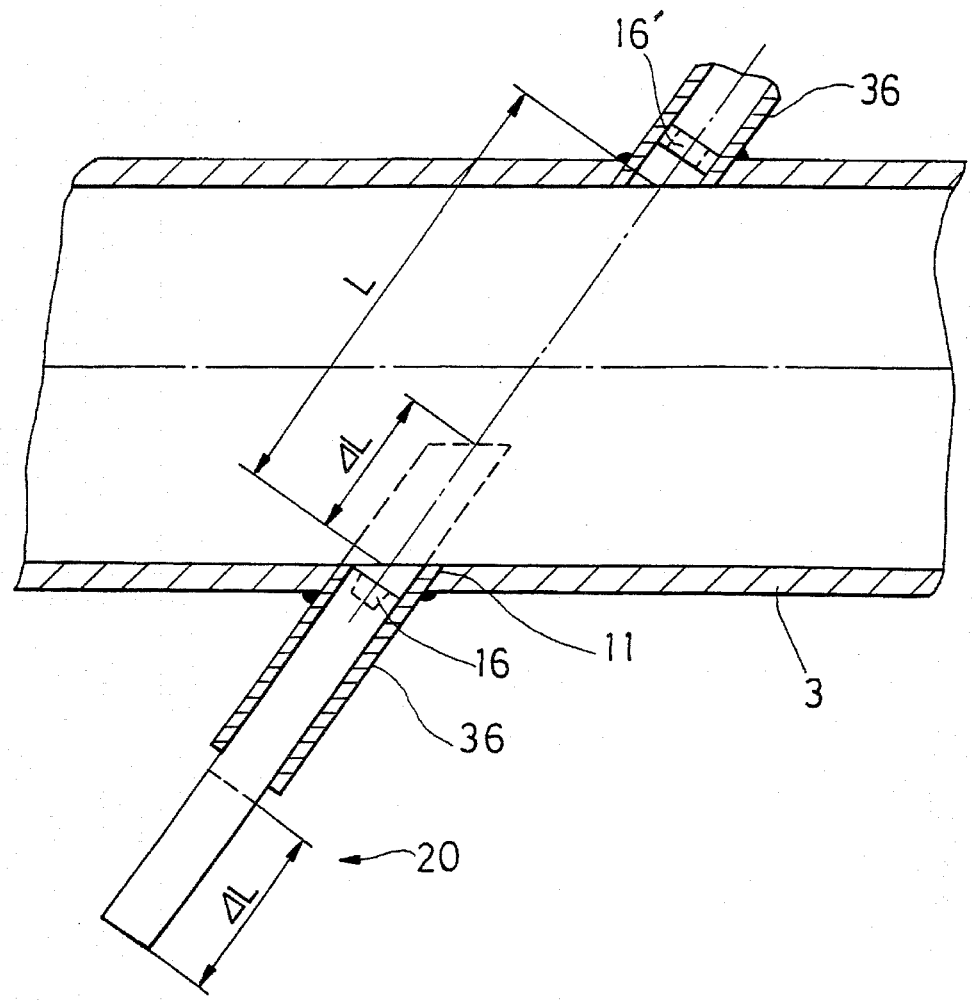
FIG. 19 is a view illustrating the configuration of the ultrasonic vibrator apparatus which the ultrasonic vibrator can be moved by a predetermined distance L into the pipe according to the principal of the invention; and, FIG. 20 is a view illustrating the method for mounting an ultrasonic vibrator apparatus on a pipe in a multi-channel arrangement according to the principal of the invention.

The measuring method of the propagation distance $L_o$ is as follows:

As shown in FIG. 19, a pipe 3 includes holes 11 located at predetermined positions onto which an ultrasonic vibrator apparatus 20 is mounted. A receptacle 36 is fitted into the holes 11 in the form of a pipe, a part of which extends outward by a predetermined length. The receptacle 36 comprises the ultrasonic vibrator apparatus 20 provided with an ultrasonic vibrator 16 mounted in such a way that it can slide therein. The ultrasonic vibrator 16 is positioned on the center line of the receptacle 36 so that it can move the distance L in the receptacle 36.

Therefore, after the ultrasonic vibrator apparatus 20 is mounted in the receptacle 36, liquid is inserted into the pipe 3 for a predetermined period of time, so that the liquid, the pipe 3 and the ultrasonic vibrator 16 are kept at the same temperature. Next, the liquid flow is stopped by closing a liquid supplying valve in order to make the flow velocity zero ($V_s$=0). Then, the ultrasonic pulse is transmitted from the ultrasonic vibrator 16 to the ultrasonic vibrator 16' or from the ultrasonic vibrator 16' to the ultrasonic vibrator 16 so as to measure the propagation time $t_1$ of the ultrasonic pulse by a standard time difference meter. After the completion of the measuring, the ultrasonic vibrator 16 is pressed into the pipe, the distance of insertion L is exactly measured, and the propagation time $t_2$ of the ultrasonic pulse is also measured. Thereafter, the ultrasonic vibrator 16 is returned to the original position.

Based on the measuring values of the propagation time $t_1$ and $t_2$ and the distance L, the ultrasonic velocity $C_w$ of the liquid is calculated as follows:

$$t_2 - t_1 = \frac{\Delta L}{C_w^0} \quad (25)$$

$$C_w^0 = \frac{\Delta L}{t_2 - t_1}$$

Wherein, the time $t_o$ is mutually canceled. The time $t_1$ is measured in turns on every channel. The distance $L_i$ for every channel is calculated as follows:

$$t_{1i}^0 = t_{1i} - t_0 = \frac{L_i}{C_w^0} \quad (26)$$

$$L_i = C_w^0 \cdot t_{1i}^0 = \Delta L \frac{t_{1i} - t_0}{t_2 - t_1}$$

Wherein, i is a channel number, and $C^0_w$ is an ultrasonic velocity calculated by formula 25, time $t_0$ having been previously measured using the formula ($t_0 = 2t_s + \tau_o$).

Thus, if the flow velocity $V_i$ is zero ($V_f$=0), the propagation distance $L_i$ of the ultrasonic signal in liquid can be measured much more accurately by the ultrasonic technology over the measures in the geometric distance calculation or the use of any rule, etc.

After the completion of the measurement of the time $t_{1i}$ for the distance $L_i$ on every channel, the maximum flow in the pipe is assured by opening the liquid supply valve or operating a pump. Under these conditions, the ultrasonic pulse is transmitted in a direction contrary to the flow direction, and then the times $t_{+1}$ and $t_{-1}$ are measured. Herein it is noted that the time measurement is repeated through several tens of times in order to obtain an average value, thereby reducing the chance of the accidental error.

The propagation of the actual distance $L_o$ of the ultrasonic pulse during the flowing of the liquid is calculated as follows:

First, the ultrasonic velocity $C'_w$ is computed using the distance $L_i$ previously measured when the flow velocity $V_i$ is zero. For example, the ultrasonic velocity $C'_w$ is assumed to be;

$$t_{+i}^0 + t_{-i}^0 = (t_{+i} - t_{0i}) + (t_{-i} - t_{0i}) = \frac{2L_i}{C_w'\left(1 - \frac{v^2}{C_w'^2}\right)} \quad (27)$$

$$C_{wi}' = \frac{2L_i}{(t_{+i}^0 + t_{-i}^0)\left(1 - \frac{v^2}{C_w'^2}\right)}$$

If $L=L_o$, $C'_w$ will be equal to $C^0_w$ ($C^0_w$ is calculated by formula 25) But if $L \neq L_o$, $C'_w$ is not equal to $C^0_w$. The formula is established:

$$C_w^0 = \frac{2L_0}{(t_{+i}^0 + t_{-i}^0)\left(1 - \frac{v^2}{C_w'^2}\right)} \quad (28)$$

In other words if $C'_w \neq C^0_w$, $L \neq L_o$. Thus, the ratio of the formula 28 and 17 is obtained to calculate the distance $L_o$ is follows:

$$\alpha = \frac{C_w^0}{C_{wi}'} = \frac{L_{0i}}{L_i} \cdot \frac{1 - \frac{v_i^2}{C_w'^2}}{1 - \frac{v_i^2}{C_w^{0^2}}}$$

$$L_{0i} = \alpha L_i \frac{1 - \frac{v_i^2}{C_w^{0^2}}}{1 - \frac{v_i^2}{C_w'^2}}$$

Herein, the unknown number is $V_i$. On the other hand, the ultrasonic velocity $C_w$ in liquid exceeds 1000 meters/second (m/s), but the flow velocity $V_i$ under the normal conditions is less than 10 m/s ($V_i < 10$ m/s) Thus the value of $v^2/C^2_w$ is very small. For example, when the ultrasonic velocity $C^0_w$ is 1450 m/s and the flow velocity $V_i$ is 10 m/s, the calculation value is $50'10^{-6}$ ($10^2/1450^2$). Also, when the difference between the ultrasonic velocities $C'_w$ and $C^0_w$ is small the value of $v^2_i/C^2_w$ is ignored. As a result, the following formula is obtained.

$$L_{0i} = \alpha L_i = \frac{C_w^0}{C_{wi}'} \cdot L_i \quad (29)$$

As described above, the actual distance $L_{oi}$ is theoretically computed by formula 29, but the measuring errors of the ultrasonic velocities $C^0_w$ and $C_{wi}$ are accumulated. Therefore, it may be preferable to use the following formulas instead of formula 29 (where the value of $V^2/C^2$ is ignored).

$$C_w^0 - C_w' = \frac{2L_{0i}}{t_+^0 + t_-^0} - \frac{2L_i}{t_+^0 + t_-^0} \quad (30)$$

$$= \frac{2(L_{0i} - L_i)}{t_+^0 + t_-^0} = \frac{2\delta L}{t_+^0 + t_-^0}$$

$$\delta L = \frac{C_w^0 - C_w}{2} (t_+^0 + t_-^0)$$

$$L_{oi} = L_i + \delta L$$

Figure 5:
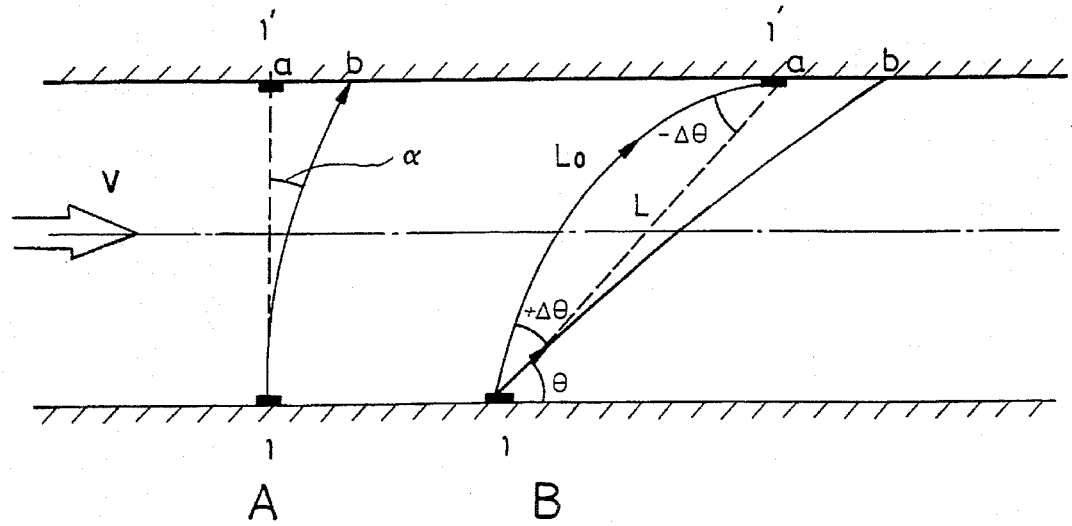
FIG. 5 and FIG. 6 are views illustrating the propagation tracks of ultrasonics in a large caliber pipe.
Figure 6:
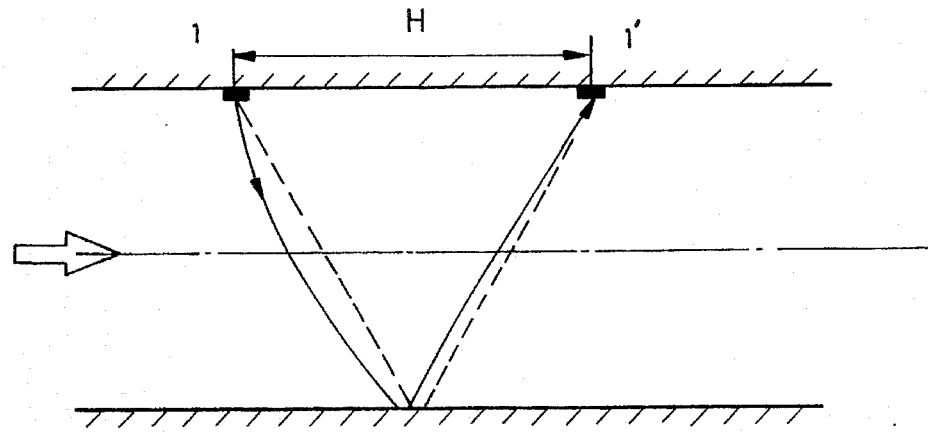
Figure 7:
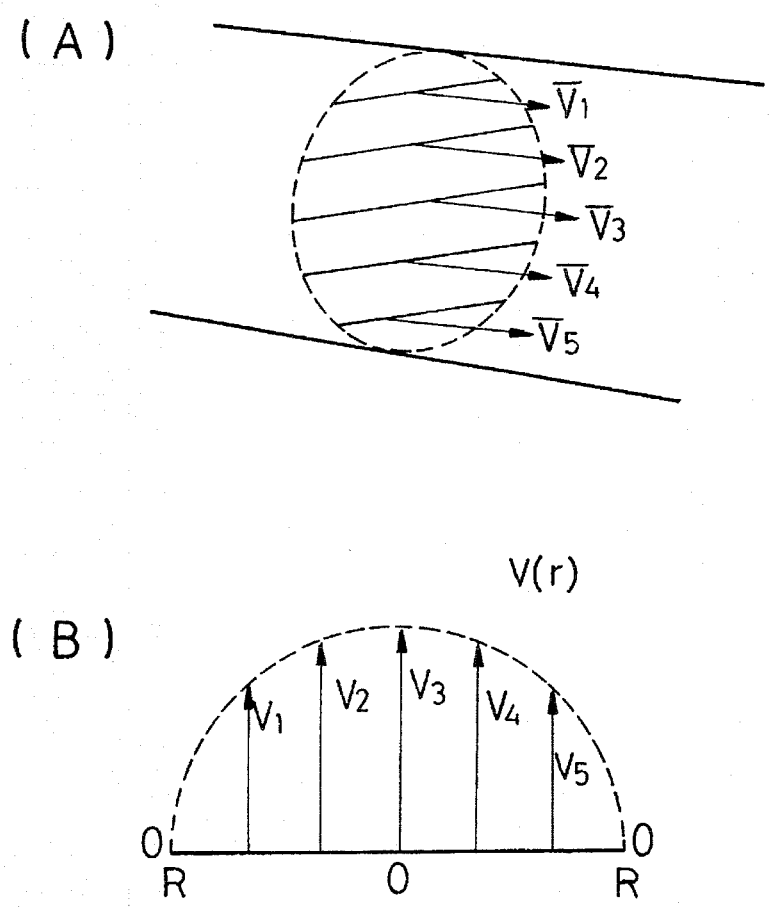
FIG. 7, A and B are views illustrating the principal of multi-channel flow measuring according to the invention.
Figure 8:
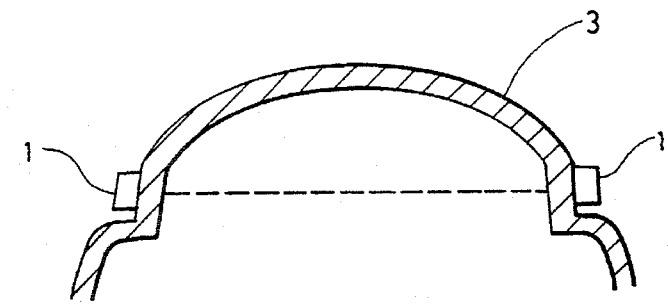
FIG. 8 is a view illustrating one embodiment of the ultrasonic vibrators mounted on the outer wall of the pipe.

Therefore, it is noted that formula 30 enables the fixed measuring errors of the ultrasonic velocities $C^0_w$ and $C_{wi}$ to offset each other. Furthermore, if the flow rate is small, the actual distance $L_{oi}$ is considered to be equal to $L_i$ ($L_{oi} = L_i$). At the time of the maximum flow rate, the actual $L_{oi}$ will be equal to $L_i + \delta L$. It is assumed that $L_o = f(Q)$ is the lineal function and it is previously stored at the calculation portion of an ultrasonic flow measuring apparatus. An angle $\theta$, formed between a line $L_i$ and the center line of the pipe, is not required for its correction. As shown in FIG. 5, the ultrasonic beam transmitted at the angle of $\theta + \Delta\theta$ is received at the other side at the angle $\theta - \theta'$. Even if the angle $\Delta\theta$ is not precisely equal to the angle $\Delta\theta'$, they are very similar. Thus, these angles cancel each other. The angle $\theta$ is calculated without using a protractor as follows:

$$\theta_i = \arcsin\left(\frac{l_i}{L_i}\right) \quad (31)$$

Wherein, li is the distance of a chord per every channel. The chord distance li on the diameter line is D ($l_i = D$), in which D is the inner diameter of the pipe. The angle $\theta$. is very precisely measured with respect to the inner and outer diameters of the pipe and the relative positions of the ultrasonic vibrators. That is why it is very easy for a standard time meter to measure the propagation time of the ultrasonic pulse to a degree of accuracy over 10-3%.

Figure 20:
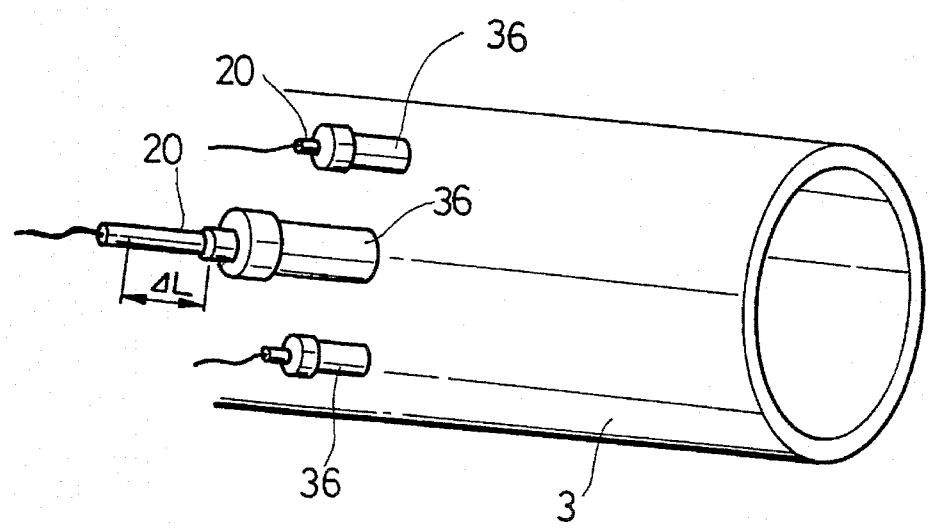

As shown in FIG. 20, an ultrasonic vibrator apparatus 20 including an ultrasonic vibrator, which forms a channel along the diameter line of the pipe, is inserted into any one of the receptacles 36 from its original position at a distance $\Delta L$ in order to measure the distances $L_o$ and $L_{oi}$ and the ultrasonic velocity $C_w$. A means for measuring the distance $\Delta L$ is mounted on the outer wall of the pipe or in the receptacle 36. The distance L is one-fourth of the inner diameter of the pipe when the pipe diameter is small, or it is about 150 mm when the pipe diameter is large. The accurate measurement of the distance has not any problem in the technical respect (with an error less than 0.05%). Also, when the distance $\Delta L$ is 150 mm, the propagation time difference of the ultrasonic velocity in water is approximately $10^{-4}$ sec., and with current technology a time difference meter can measure the distance $\Delta L$ to a degree of the accuracy of $10^{-8}$ sec. Therefore, the particular measuring technical data is not required. As a result, the invention significantly reduces the measurement errors for parameters $t_o$, $L_o$, $C_w$, $\theta$ because the measuring of the flow velocity is considered to constitute a fundamental error in calculating the flow rate.

Next, the measuring (calculation) error of the total average flow velocity $V_s$ related to the entire cross-sectional area of the liquid may come into question. In other words, one channel of the ultrasonic flow meter cause the flow rate coefficient mq or the flow velocity coefficient $m_v$ to be multiplied by the average flow velocity so as to computes the total average flow velocity $V_s$, in which it becomes the fundamental cause of the flow measuring error because the coefficient is not an integer within the flow measuring range and it changes according to other factors. In contrast to the flow meter, a multi-channel flow measuring apparatus enables the average flow velocity to be measured at numerous different cross-sectional areas and performs the approximate integration calculation based on the measured results in order to obtain the total average flow velocity $V_s$, in which the approximate integration error may be considered to cause the principal error in the flow rate calculation.

Thus, the approximate integration error must be accurately examined to determine the error of the flow measurement. The approximate integration error can be resolved according to the following method.

Figure 1:
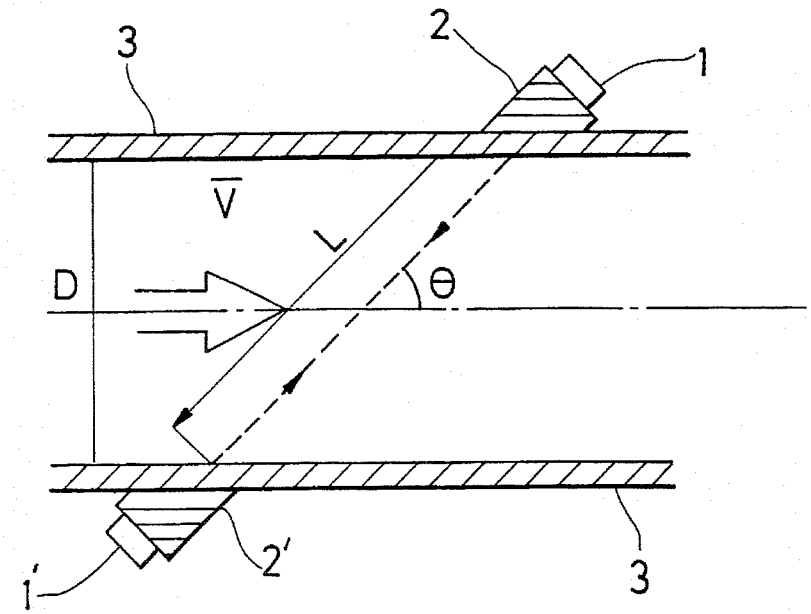
FIG. 1 is a view illustrating the principal of a conventional one channel ultrasonic flow meter.
Figure 2:
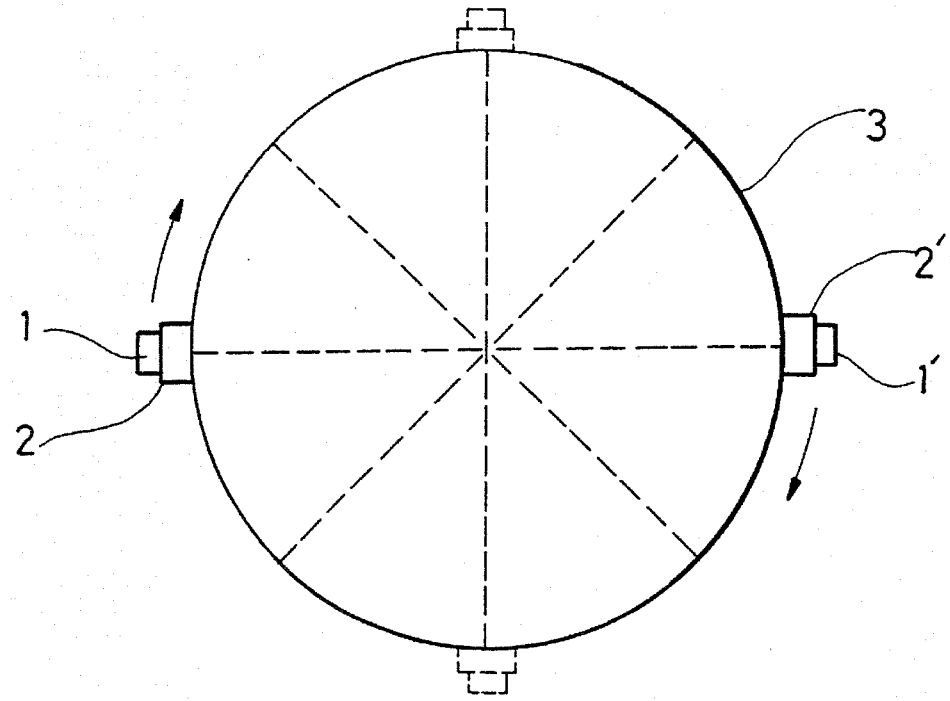
FIG. 2 is a view illustrating the position of an ultrasonic vibrator of the conventional one channel ultrasonic flow meter.
Figure 3:
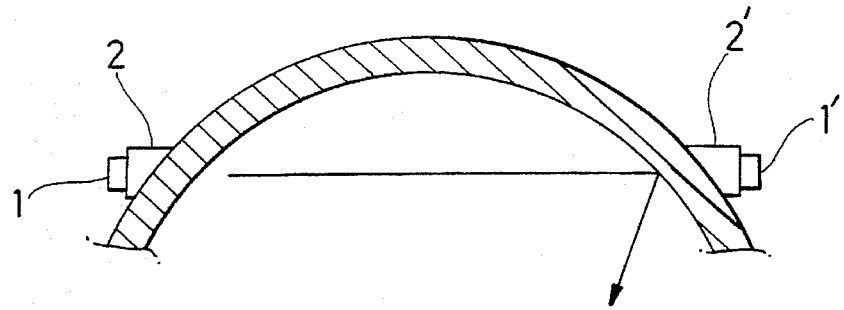
FIG. 3 is a view illustrating the conventional one channel ultrasonic flow meter which is mounted on the pipe wall deviating from the diameter line.
Figure 4:
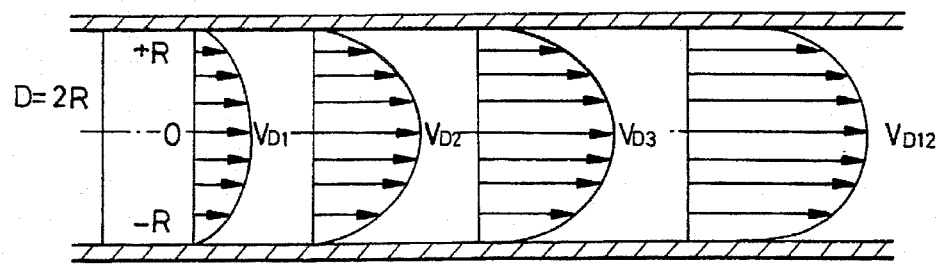
FIG. 4 is a view illustrating the flow velocity distribution according to the flow change in the pipe.

As shown in FIG. 4, a plurality of flow velocity distributions according to the flow rate changes (changes in the Reynolds Number (Re) are theoretically made and precisely integrated by formula 16 to calculate the theoretical cross-sectional average flow velocity $V^0_s$). Next, in the flow velocity distribution, the flow velocity $V_i$ corresponding to the channel coordinate of the flow measuring meter, for example the electrical signal corresponding to the approximate integration circuit's input of the flow meter such as $\Delta t_i$, $\Delta F_i$ etc., is calculated. Then the signals corresponding to the calculated values are inputted to an approximate integration circuit. Thus, the multi-channel flow measuring apparatus does not need the correction test by the direct standard flow meter independent of the diameter of the pipe. Also, the invention facilitates the detection of the measurement errors of the parameters $t_o$, $L_i$, $L_o$, $\theta$ etc. The measurement errors of times $t_+$ and $t_-$ and frequencies $f_+$ and $f_-$ become known and the approximate integration error provides for the total error of the flow measurement to be calculated.

As described above, a multi-channel ultrasonic flow measuring apparatus enables the flow measurement error to be detected with a high reliability without the need of a correction examination by the classical standard flow meter. The multi-channel ultrasonic flow measuring apparatus can be widely used not only for a large caliber pipe, but also as a standard flow meter for correcting another flow meter in situ.

What is claimed is:

1. A method for measuring the flow rate of a large caliber pipe comprising steps of:

mounting a plurality of ultrasonic vibrators on both the left and the right side radius of the circle circumference in a plurality of channels arranged by reference to the diameter line of the pipe, in which one channel is disposed along the diameter line, a part of the channels are arranged on one side radius to meet the formula l=2R/(N+1), and other channels are arranged on the opposite side radius to meet l'=½=R/(N+1);

measuring the propagation time $t_1$ of the ultrasonic pulse every channel;

measuring the propagation time $\Delta t$ of the ultrasonic pulse when any one of the ultrasonic vibrators is inserted into the pipe at a distance $\Delta L$ on one of the channels;

calculating the propagation distance of the ultrasonic pulse in the liquid at the other channels; and, calculating the average flow velocity $V_s$ of the pipe cross-sectional area using all parameters obtained by performing the above steps.

2. The method for measuring the flow rate in a large caliber pipe according to claim 1, in which:

the time difference method for measuring the ultrasonic flow velocity is calculated using the following formulas;

$$\Delta t = \frac{2L_0 v}{C_w^2}$$

$$C_w = \frac{2L_0}{(t_+ + t_- - 2t_0)}$$

The frequency difference method is calculated as follows;

$$\Delta F = \left( \frac{C_w + v}{L_0} + \frac{C_w - v}{L_0} \right)$$
   $$= \frac{1}{t_+ - t_0} - \frac{1}{t_- - t_0} .$$

3. The method for measuring the flow rate of a large caliber pipe according to claim 1, in which:

after the ultrasonic vibrator is fixed to a block having slanted surfaces, and the ultrasonic vibrators are arranged in a water container with the slanted surfaces of the blocks facing opposite from each other, the propagation time $t_1$ of the ultrasonic pulse is measured at the distance $L_1$ formed between the blocks, the propagation time $t_2$ of the ultrasonic pulse is measured at the distance which is wider than the distance $L_1$ by the distance $L_2$, the ultrasonic velocity $C_w$ is computed using the following formulas and then substituted into the following formula $t_1$, and the total delay time to is then calculated $$t_2 = \frac{L_1}{C_w} + \frac{L_2}{C_w} + t_0,$$

$$t_1 = \frac{L_1}{C_w} + t_0$$

$$t_2 - t_1 = \frac{L_2}{C_w},$$

$$t_0 = t_1 - \frac{L_1}{C_w} = t_1 - \frac{L_1}{L_2} \cdot (t_2 - t_1)$$

$$C_w = \frac{L_2}{(t_2 - t_1)} .$$

4. The method for measuring the flow rate of a large caliber pipe according to claim 1, in which:

the flow measuring method furthermore comprises a method for correcting the measurement error of angle θ to the center line of the pipe and the propagation distance $L_o$ of the ultrasonic signal in the liquid, the correcting method comprising steps of:

measuring the propagation time $t_D$ of the ultrasonic pulse when the pipe is completely filled up in the pipe and the flow velocity $V_s$ of the liquid is zero;

measuring the propagation time $t_L$ of the ultrasonic pulse, after an ultrasonic vibrator on any channel of a plurality of channels around the circumference of the pipe is inserted into the pipe at a distance L;

Calculating the ultrasonic velocity $C_w$ as follows;

$$t_D = \frac{L_D}{C_w} + t_0,$$

$$t_{\Delta L} = \frac{L_D}{C_w} - \frac{\Delta L}{C_w} + t_0$$

$$t_D - t_{\Delta L} = \frac{\Delta L}{C_w},$$

$$C_w = \frac{\Delta L}{(t_D - t_{\Delta L})}$$

calculating the propagation distance $L_D$ of the ultrasonic pulse using the ultrasonic velocity $C_w$ and the propagation time $t_D$ as follows:

$$L_D = \frac{(t_D - t_0)}{C_w}$$

calculating the propagation distance $L_i$ of the ultrasonic signals on other channels in the liquid in turns as follows:

$$L_i = \frac{(t_i - t_0)}{C_w} .$$

5. The method for measuring the flow rate of a large caliber pipe according to claim 1, in which:

measuring the propagation times $t_{+i}$ and $t_{-i}$ of the ultrasonic signals in either the direction of the flow or opposite to the flow and then calculating the ultrasonic velocity $C'_{wi}$ as follow: if the propagation distance $L_i$ of an ultrasonic signal is shorter than the distance $L_o$ along which an ultrasonic signal is propagated to another ultrasonic vibrator when the diameter is large and the flow velocity is fast; and, $$C_{wi}' = \frac{2L_i}{(t_{+i} + t_{-i} - 2t_0)}$$

measuring the actual distance $L_{oi}$ as follows: if the measured ultrasonic velocity $C'_{wi}$ is not equal to the ultrasonic velocity $C_w$ measured when the flow velocity $V_i$ is zero $$L_{0i} = L_i + \frac{C_w - C_w'}{2} \cdot (t_{+i} + t_{-i} - 2t_0).$$

* * * * *